United States Patent
Kawajiri

(10) Patent No.: US 10,574,854 B2
(45) Date of Patent: Feb. 25, 2020

(54) IMAGING PROCESSING APPARATUS FOR RECEIVING PRINT DATA FROM SERVER AND PERFORMING IMAGE PROCESSING AND METHOD FOR CONTROLLING THE SAME

(71) Applicant: CANON KABUSHIKI KAISHA, Tokyo (JP)

(72) Inventor: Kensuke Kawajiri, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/597,031

(22) Filed: May 16, 2017

(65) Prior Publication Data

US 2017/0339305 A1 Nov. 23, 2017

(30) Foreign Application Priority Data

May 23, 2016 (JP) ................................. 2016-102861

(51) Int. Cl.
*G06F 15/00* (2006.01)
*H04N 1/32* (2006.01)
*H04N 1/00* (2006.01)

(52) U.S. Cl.
CPC ..... *H04N 1/32657* (2013.01); *H04N 1/00344* (2013.01); *H04N 1/00893* (2013.01); *H04N 1/32635* (2013.01); *H04N 2201/0094* (2013.01); *H04N 2201/3204* (2013.01); *H04N 2201/3215* (2013.01)

(58) Field of Classification Search
CPC ........... H04N 1/32657; H04N 1/00344; H04N 1/00893; H04N 1/32635
USPC ...................................................... 358/1.14
See application file for complete search history.

(56) References Cited

U.S. PATENT DOCUMENTS

| | | | | |
|---|---|---|---|---|
| 5,557,585 A | * | 9/1996 | Hanai | G04R 20/18 368/10 |
| 7,054,019 B1 | * | 5/2006 | Simpson | G06K 15/00 358/1.15 |
| 2006/0156011 A1 | * | 7/2006 | Masui | H04L 63/1466 713/178 |
| 2011/0134452 A1 | * | 6/2011 | Kim | G06F 3/1204 358/1.13 |

FOREIGN PATENT DOCUMENTS

| | | |
|---|---|---|
| JP | 2005-115660 A | 4/2005 |
| JP | 2006-215719 A | 8/2006 |
| JP | 2016-66175 A | 4/2016 |

OTHER PUBLICATIONS

Machine translation of Japanese Patent Document No. 2016-066175, Hama, Apr. 28, 2016 (Year: 2016).*

* cited by examiner

*Primary Examiner* — Mark R Milia
(74) *Attorney, Agent, or Firm* — Canon U.S.A., Inc. IP Division

(57) ABSTRACT

A printer for use in an image forming system including a local area network (LAN) interface for communicating with a server, a printer engine, and an operation unit includes a control unit including a central processing unit (CPU) and a memory such as a random access memory (RAM), and the control unit is capable of performing processing to store a server printing setting flag and notification processing to perform notification to prompt a user to give a setting instruction if an internal time is detected to be initialized and the server printing setting flag is stored.

17 Claims, 14 Drawing Sheets

FIG. 11A

1110 — WARNING

TIME IS NOT UPDATED BECAUSE BATTERY RUNS DOWN.
SERVER PRINTING FUNCTION CANNOT BE USED WHEN
TIME SETTING IS INCORRECT.

1111 — TIME SETTING
1112 — SNTP SERVER SETTING
1113 — DO NOT SET

FIG. 11B

1120 — TIME SETTING

PLEASE SET CURRENT TIME

1121 — 20 ——/——:—— AM

1122 — APPLY
1123 — CANCEL

FIG. 11C

1130 — SNTP SERVER SETTING

SNTP SERVER NAME: 1131

POLLING INTERVAL (1 TO 48 HOURS): 1132

1133 — APPLY
1134 — CANCEL

IMAGING PROCESSING APPARATUS FOR RECEIVING PRINT DATA FROM SERVER AND PERFORMING IMAGE PROCESSING AND METHOD FOR CONTROLLING THE SAME

BACKGROUND

Field of Art

The present disclosure relates to an image processing apparatus for processing image information for use in printing. The image processing apparatus is used in, for example, image forming apparatuses such as copying machines, printers, faxes, and multi-function peripherals including a plurality of functions thereof.

Description of the Related Art

In a conventional printer (image forming apparatus), an image is formed (printed) on a sheet (recording material) based on print data. The print data is managed by a controller (image processing apparatus) in the printer. Further, a cloud printing function (server printing function) of such a printer is known, which performs printing based on print data received from a cloud server as discussed in Japanese Patent Application Laid-Open No. 2005-115660.

Meanwhile, from the point of view of security, some of the cloud servers do not transmit print data to a printer when an internal time of the printer is different from a current time. Therefore, in a printing system using such a server, the printer cannot use the server printing function when the internal time of the printer is different from the current time. In such a case, the server printing function becomes usable again by setting the internal time again. However, it is difficult for the user to recognize such a solution.

SUMMARY

The present disclosure is directed to an image processing apparatus having excellent usability, including a server printing function therein different in whether the server printing function is usable or not depending on the state of an internal time.

According to an aspect of the present disclosure, an image processing apparatus capable of communicating with a server configured to manage print data and using an image forming unit configured to form an image on a sheet, a notification unit configured to notify a user of information, and a retaining unit configured to retain an internal time, includes a controller having a processor which executes instructions stored in a memory or having circuitry, the controller being configured to perform server printing processing to receive print data from the server and cause the image forming unit to form an image, processing to store setting information indicating whether to permit execution of the server printing processing, and processing to cause the notification unit to notify the user of information for prompting setting of the internal time if the retaining unit is detected to be in a predetermined state and the setting information indicates that execution of the server printing processing is permitted.

Further features of the present invention will become apparent from the following description of exemplary embodiments with reference to the attached drawings.

BRIEF DESCRIPTION OF THE DRAWINGS

FIG. 7 is a flow chart illustrating a warning processing determination flow when a printer is turned on.

FIGS. 11A, 11B, and 11C respectively illustrate a warning screen, a time setting screen, and a simple network time protocol (SNTP) server setting screen.

DESCRIPTION OF THE EMBODIMENTS

Various exemplary embodiments will be described below. In the exemplary embodiments, an image forming system 100 including a personal computer (PC) 101, a server 102, and a printer 103 will be described as an example. Configurations of systems to which an exemplary embodiment of the present invention is applicable are not limited to configurations described in the exemplary embodiments. A portion of the configurations can be replaced by an equivalent within a range in which an advantage of the invention can be obtained.

<Image Forming System>

Figure 1:
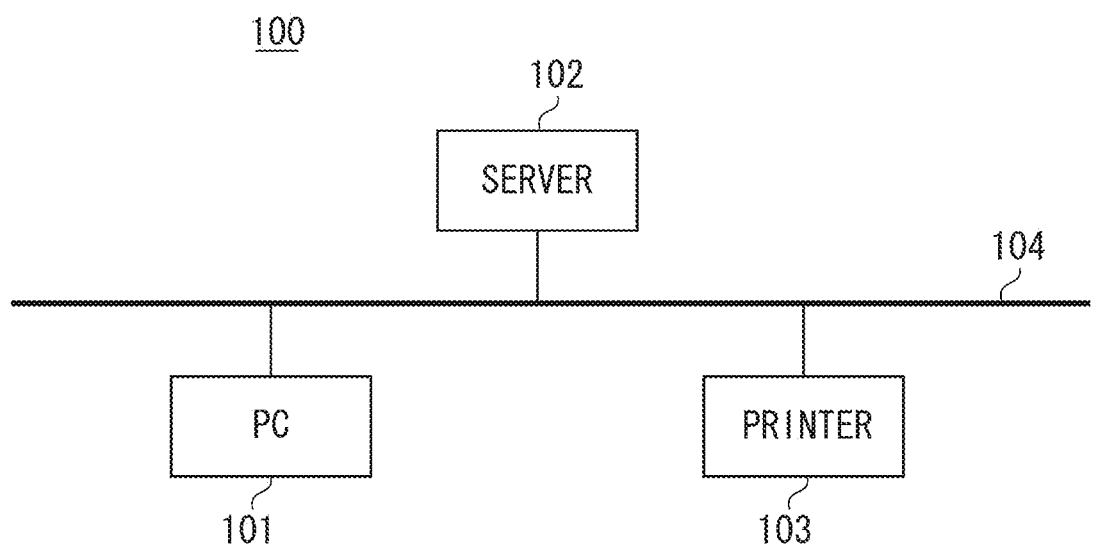
FIG. 1 is a block diagram illustrating an image forming system according to an exemplary embodiment.

The image forming system 100 will be described. FIG. 1 is a block diagram illustrating the image forming system 100 according to a first exemplary embodiment.

The image forming system 100 includes the PC 101, the server 102, and the printer 103. The PC 101, the server 102, and the printer 103 are connected by a network 104 to be communicable with each other.

The PC 101 is an information processing apparatus to be operable by a user. The PC 101 can transmit print data to the server 102 or the printer 103. Further, the PC 101 can give a print instruction to the server 102 or the printer 103. The PC 101 may be a mobile terminal that is an information terminal capable of accessing the network 104.

The server 102 is a data storage apparatus for storing print data. The server 102 can receive print data from an external device via the network 104 and store the print data. Further, the server 102 can transmit (is capable of transmitting) the stored print data to the printer 103 according to an instruction from the PC 101. The server 102 according to the present exemplary embodiment is a secure server, so the server 102 is prohibited from transmitting and receiving data (print data is not transmittable) to and from an external terminal that is in an incorrect state, because a device with inappropriate time can cause a security hole. For example, in a device with incorrect time, restoration of an expired certificate, and the like can occur. Further, if the server 102 is erroneously synchronized with such a device, a similar problem can also occur in the server 102.

The printer 103 is an image forming apparatus configured to form an image on a recording material (sheet) based on print data. The printer 103 can receive the print data from the PC 101 or the server 102. In the present exemplary embodiment, an electrophotographic printer configured to form images with toner is used as the printer 103.

<Configurations of PC and Server>

Figure 2:
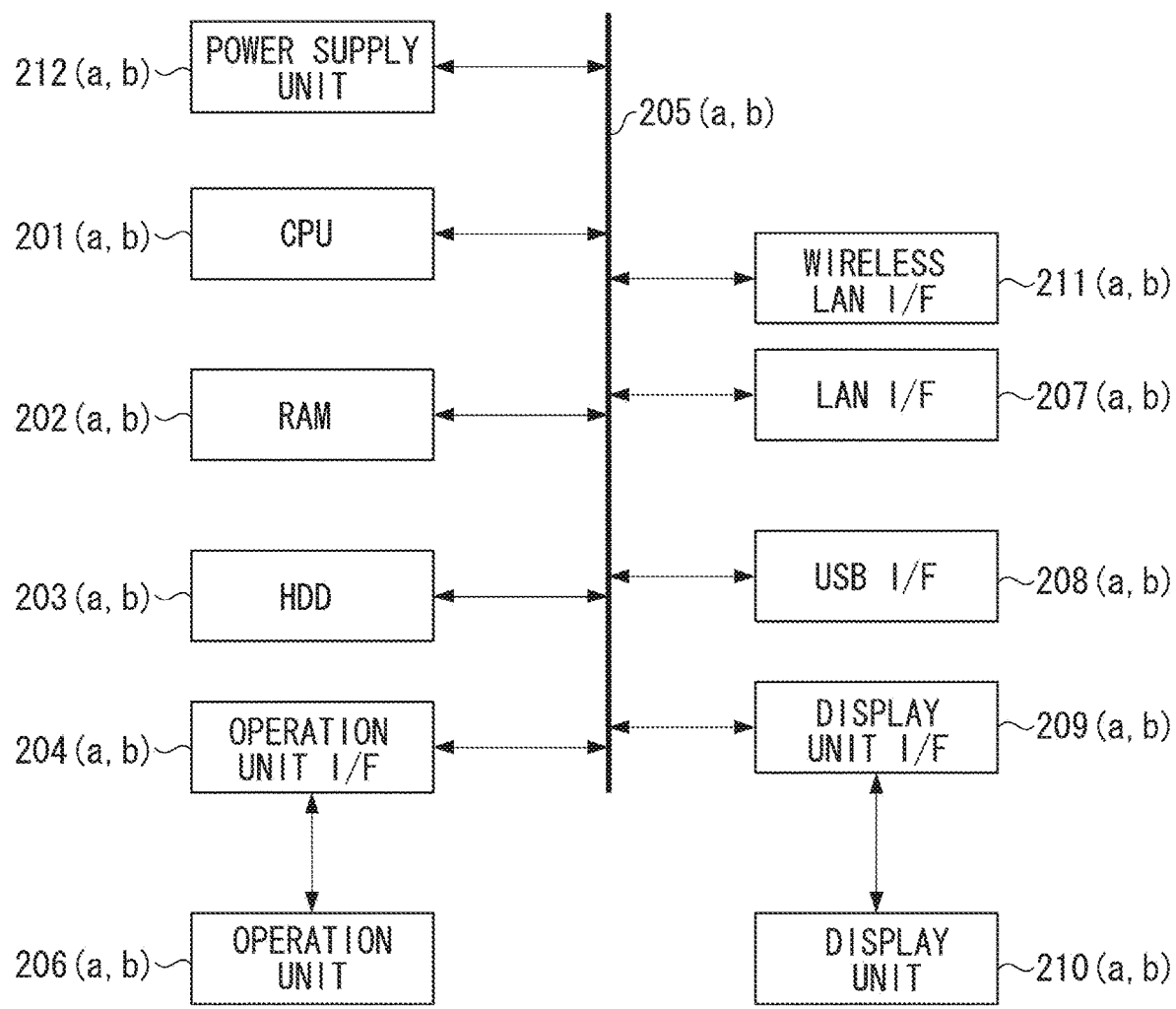
FIG. 2 is a block diagram illustrating configurations of a personal computer (PC) and a server.

The hardware configurations of the PC 101 and the server 102 will be described. FIG. 2 is a block diagram illustrating the hardware configurations of the PC 101 and the server 102.

In the present exemplary embodiment, to simplify the description, the PC 101 and the server 102 have the same configuration. Alternatively, the PC 101 and the server 102 can have different configurations. Hereinafter, ""a"" is attached at the end of each reference numeral of a component of the PC 101 and "b" at the end of each reference numeral of a component of the server 102 to discriminate between the configurations of the PC 101 and the server 102. However, when the discrimination is not necessary, "a" and "b" are not attached.

The PC 101 includes a central processing unit (CPU) 201a, a random access memory (RAM) 202a, a hard disk drive (HDD) 203a, an operation unit interface 204a, an operation unit 206a, a wireless local area network (LAN) interface 211a, a LAN interface 207a, a universal serial bus (USB) interface 208a, a display unit interface 209a, and a display unit 210a.

The server 102 includes a CPU 201b, a RAM 202b, a HDD 203b, an operation unit interface 204b, an operation unit 206b, a wireless LAN interface 211b, a LAN interface 207b, a USB interface 208b, a display unit interface 209b, and a display unit 210b.

The CPU 201 is a processor used to control the apparatus. The RAM 202 is a system work memory for operations of the CPU 201. Further, the RAM 202 is used as a program memory for recording programs. The HDD 203 is a data storage area for storing data. For example, print data is stored on the HDD 203. The operation unit interface 204 is an interface for communication with the operation unit 206. The operation unit interface 204 has a function of receiving input signals from the operation unit 206 and transmitting the input signals to the CPU 201. The display unit interface 209 is an interface for communication with the display unit 210. The display unit interface 209 outputs output signals to the display unit 210 according to the control by the CPU 201. The USB interface 208 is a communication interface for connecting to a USB device. The USB interface 208 is used to acquire the status of another device and return the status via the USB device. The LAN interface 207 is a communication interface for connecting to a LAN. The LAN interface 207 is used to acquire the status of another device and return the status via the LAN. A power supply unit 212 is a power source unit configured to supply power to modules located on a system bus 205. The above-described devices are connected with each other via the system bus 205 to operate in a cooperative manner.

Having the above-described configuration, the PC 101 and the server 102 can deal with the print data in the image forming system 100.

<Configuration of Printer>

Figure 3:
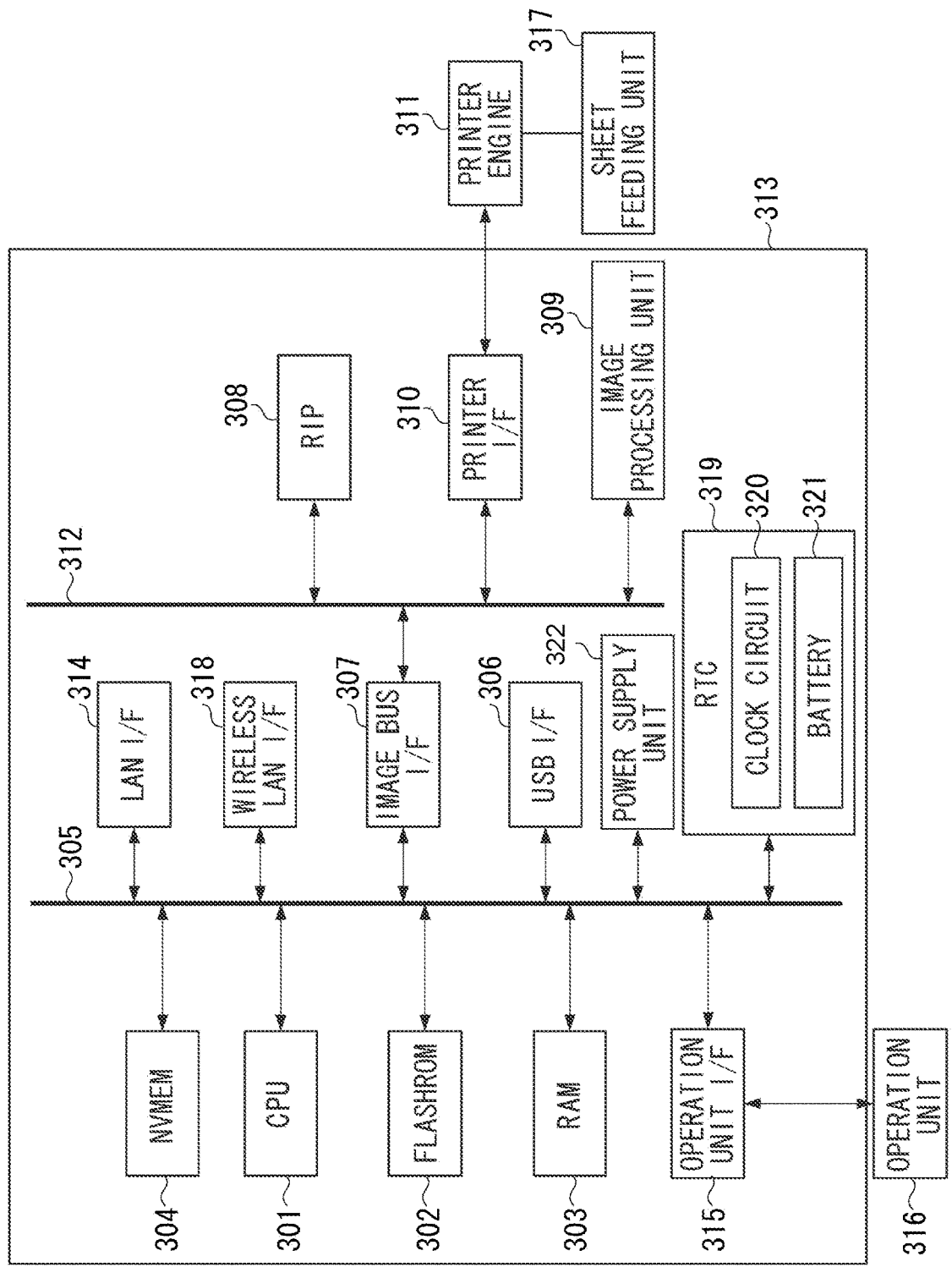
FIG. 3 is a block diagram illustrating a configuration of a printer.

The hardware configuration of the printer 103 will be described. FIG. 3 is a block diagram illustrating the hardware configuration of the printer 103.

The printer 103 is an image forming apparatus (printing apparatus) for forming (prints) an image on a recording material (sheet, recording sheet, or paper). As illustrated in FIG. 3, the printer 103 includes a controller unit 313, an operation unit 316, a printer engine 311, and a sheet feeding unit 317. The controller unit 313 performs various types of control of the printer 103. The operation unit 316 receives user instructions. The printer engine 311 forms images. Recording materials are set in the sheet feeding unit 317.

The printer engine 311 is an image forming unit including a mechanism for forming an image on a recording material (paper, sheet). The printer engine 311 forms an image based on an instruction from the controller unit 313. Examples of the printer engine 311 include an electrophotographic printer engine.

The sheet feeding unit 317 is a mechanism for holding recording materials. The sheet feeding unit 317 feeds a recording material to the printer engine 311 when the printer engine 311 executes image forming processing.

The operation unit 316 is a user interface (operation panel) which can be operated by the user. The operation unit 316 includes components such as a power switch, numeric keys, a one-touch key, a start key, a stop key, a set key, a reset key, a power-saving key, various setting keys, and a touch panel.

The operation unit 316 according to the present exemplary embodiment includes a touch panel. The touch panel includes a liquid crystal unit (display unit, notification unit) and a detection sensor. The notification unit is a device that provide information to a user via as display such as the liquid crystal unit or another display. The liquid crystal unit is configured to display an information screen to the user. The detection sensor is configured to detect user operations. The operation unit 316 displays messages and objects (icons, buttons) to the user to function as an instruction unit for prompting the user to perform instruction operations and receiving the instructions. For example, an object (icon, button) is displayed on the liquid crystal screen of the touch panel, and when the user touches a portion near the object, the touch is detected by the detection sensor. At this time, the operation unit 316 recognizes that the user performs the touch operation to select the object. The operation unit 316 can selectively display a plurality of screens by switching between the screens according to the touch operation.

The controller unit 313 is a control unit for controlling the printer 103 by performing control processing based on a program. Further, the controller unit 313 is an information processing apparatus for performing information processing. In particular, the controller unit 313 is an image processing apparatus for performing image information (print data) processing. The controller unit 313 includes a CPU 301, a flash read-only memory (ROM) 302, a RAM 303, a non-volatile memory (NVMEM) 304, a system bus 305, a USB interface 306, an image bus interface 307, a raster image processor (RIP) 308, an image processing unit 309, a printer interface 310, an image bus 312, a LAN interface 314, an operation unit interface 315, a wireless LAN interface 318, a real-time clock (RTC) circuit 319, and a power supply unit 322.

The CPU 301 is an arithmetic processing unit (arithmetic processing device, central processing unit) for performing arithmetic processing. The CPU 301 comprehensively controls the devices of the printer 103. Further, the CPU 301 executes various types of processing based on programs stored in the flash ROM 302 or the RAM 303. A device such as a micro processing unit (MPU) or micro control unit (MCU) can be used as the arithmetic processing unit.

The flash ROM 302 is a rewritable non-volatile memory, and various control programs for controlling the system are recorded therein.

The RAM 303 is a system work memory for operations of the CPU 301. Further, the RAM 303 functions as a program memory for recording programs and an image memory for temporarily recording image data.

The NVMEM 304 is a non-volatile memory and stores setting information, and the like.

The LAN interface 314 is a communication interface for connecting to the network 104 via a wired LAN to perform communication. The LAN interface 314 functions as a communication unit for communicating with the PC 101 and the server 102 via the network 104.

The wireless LAN interface 318 is a communication interface for connecting to the network 104 via a wireless LAN. The wireless LAN interface 318 can communicate with the PC 101 and the server 102 via the network 104.

The USB interface 306 is a communication interface including a USB device function.

The USB interface 306 can connect to the PC 101 via a USB cable (not illustrated) to communicate with the PC 101. The printer 103 can be connected to the PC 101 and the server 102 using the USB interface 306.

The operation unit interface 315 is an interface unit for performing communication with the operation unit 316. The operation unit interface 315 receives an instruction signal from the CPU 301 and transmits the instruction signal to the operation unit 316. Further, the operation unit interface 315 receives an instruction signal from the operation unit 316 and transmits the instruction signal to the CPU 301.

The power supply unit 322 is a power source circuit for supplying power to the components of the printer 103. The power supply unit 322 can be in a running state, standby state, sleep state, or shut-down state. The running state refers to a state in which power is supplied to the components of the printer 103 so that printing can be executed. The standby state refers to a state in which power is supplied to a portion relating to the controller unit 313 of the printer 103 so that print data processing can be performed. The sleep state refers to a state in which power is supplied to a minimum portion of the printer 103 to recover (change) to the standby state when a print job is input. The shut-down state refers to a state in which the printer 103 does not operate and no power is supplied to the components of the printer 103.

The RTC circuit 319 is a time retaining circuit (real-time clock circuit) configured to retain the internal time of the apparatus. The RTC circuit 319 includes a clock circuit 320 and a battery 321. The clock circuit 320 counts the passage of time from a set time. The battery 321 supplies power to the clock circuit 320.

The RTC circuit 319 is operated by the power supplied from the power supply unit 322 or the battery 321 and is capable of retaining the current time. Therefore, the RTC circuit 319 continues to operate even when the printer 103 is in a power-disconnected state, but if no power is supplied from the power supply unit 322 for a predetermined period (if the supply of power is stopped for the predetermined period), the battery 321 runs down. If the battery 321 runs down, the time retained by the RTC circuit 319 is returned to an initial value (e.g., Jan. 1, 2000, 00:00).

The clock circuit 320 is a time measurement unit for measuring the passage of time. The clock circuit 320 continuously measures the passage of time from the initial set value to acquire not only the time but also the current date.

The battery 321 is a secondary battery. Therefore, the battery 321 can be charged by receiving power from the power supply unit 322. In the present exemplary embodiment, the battery 321 is charged when the power supply unit 322 is in the running state, the standby state, or the sleep state. The battery 321 according to the present exemplary embodiment lasts for about one week to a maximum of about three months after being charged for about one hour. Therefore, in a use case in which the power source is turned on only when the printing function is used, the battery 321 is expected to run down when the printing function is not used for a week or longer.

The above-described components in the controller unit 313 are connected to the system bus 305. The system bus 305 is a communication path for connecting the devices so that the devices can communicate with each other to transmit and receive signals. The system bus 305 is connected to the image bus 312 via the image bus interface 307.

The image bus interface 307 is a bus bridge circuit for connecting the system bus 305 and the image bus 312 and converts a data configuration.

The image bus 312 is a high-speed communication path for transmitting and receiving image information signals at high speed. Examples of the image bus 312 include a server I bus and the Institute of Electrical and Electronics Engineers (IEEE) 1394 bus. The image bus 312 is connected to the RIP 308, the printer interface 310, and the image processing unit 309.

The RIP 308 is a processor for converting vector data such as page description language (PDL) codes into a bitmap image.

The printer interface 310 is an interface for performing communication with the printer engine 311. The printer interface 310 transmits to the printer engine 311 image data converted synchronously/asynchronously.

The image processing unit 309 is an image processing unit for correcting, processing, and editing input image data. Further, the image processing unit 309 performs printer correction, resolution conversion, and the like on print output image data. Further, the image processing unit 309 performs rotation of image data and compression/decompression processing such as the Joint Photographic Experts Group (JPEG) compression on multivalued image data or the Joint Bi-level Image Experts Group (JBIG) compression, Modified Modified Read (MMR) compression, or Modified Huffmann (MH) compression on binary image data.

The controller unit 313 described above includes various components and is capable of executing various programs. Therefore, the controller unit 313 can function as various units by executing the programs.

For example, the controller unit 313 functions as a storage unit for storing a server printing setting.

The controller unit 313 functions as a retaining unit for retaining internal time information.

The controller unit 313 functions as a setting unit for setting the internal time. The controller unit 313 functions as an execution unit capable of executing processing to display a notification screen on the operation unit 316.

<Server Printing>

Figure 12:
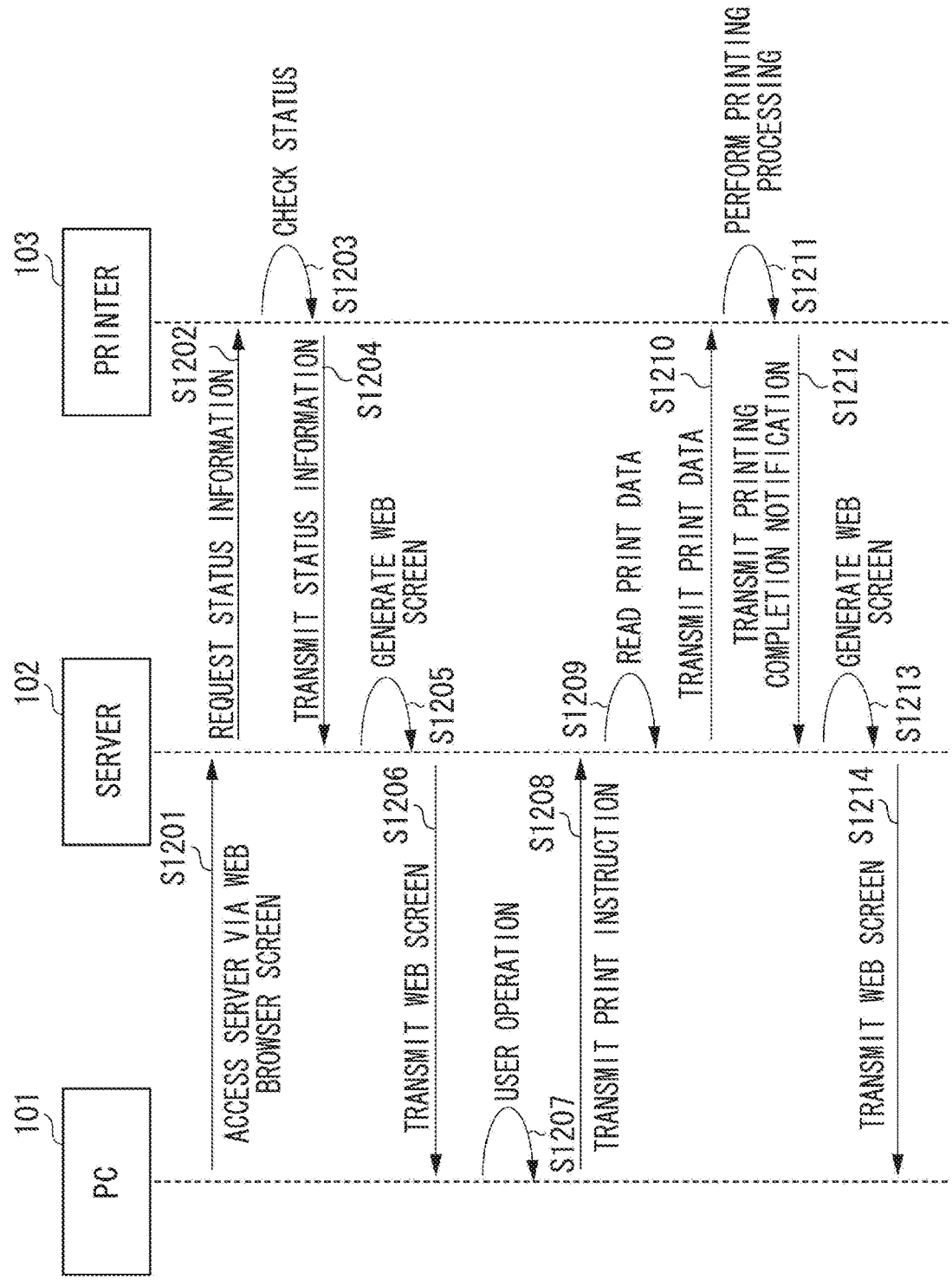
FIG. 12 is a sequence chart illustrating a communication flow involved in server printing.

The server printing processing (cloud printing processing) realized by the image forming system 100 having the above-described configuration will be described with reference to FIG. 12. FIG. 12 is a sequence chart illustrating entire processing performed by the image forming system at the time of executing the server printing processing.

In step S1201, in a case of using the server printing function, the user accesses the server 102 using the PC 101. This access is performed by a web browser executed by the CPU 201a. At this time, a web browser screen is displayed on the display unit 210a.

In step S1202, if the server 102 is accessed by the PC 101, the CPU 201b transmits to the printer 103 registered in advance a request for status information including internal time information.

In step S1203, if the request for status information is received from the server 102, the CPU 301 acquires the status information from the NVMEM 304 or the RTC circuit 319. Then, in step S1204, the CPU 301 transmits the acquired status information to the server 102. In step S1205, if the status information is received, the CPU 201b generates web screen information (web page information) based on the status information and bibliographic information about print data stored in advance in the HDD 203b. At this time, the CPU 201b compares the internal time of the server 102 with the internal time of the printer 103 included in the status information. As a result of the comparison, if the difference between the internal time of the server 102 and the internal time of the printer 103 is small (within a predetermined range) (e.g., if the difference is smaller than 48 hours), the CPU 201b generates web screen information with which a print instruction can be given. On the other hand, if the difference between the internal time of the server 102 and the internal time of the printer 103 is significantly large (outside the predetermined range) (e.g., if the difference is not smaller than 48 hours), the CPU 201b does not generate web screen information with which a print instruction can be given. The internal time of the server 102 is corrected in advance to the correct time by acquiring the time from the SNTP server.

Then, in step S1206, the CPU 201b transmits the web screen information to the PC 101. After receiving the web screen information, the CPU 201a displays a web screen on the web browser based on the received web screen information. The web screen displays information for prompting the user to give a print instruction. In step S1207, if the user operates the operation unit 206a to give a print instruction, then in step S1208, the CPU 201a transmits a command signal of the print instruction to the server 102. In step S1209, after receiving the print instruction, the CPU 201b reads selected print data from the HDD 203b based on the print instruction. Then, in step S1210, the CPU 201b transmits the print data to the printer 103. In step S1211, after receiving the print data, the CPU 301 causes the printer engine 311 to execute printing processing based on the print data. In step S1212, after the printing processing is completed, the CPU 301 transmits a printing completion notification to the server 102. In step S1213, after receiving the printing completion notification, the CPU 201b generates web screen information (web page information) based on the printing completion notification. Then, in step S1214, the CPU 201b transmits the web screen information to the PC 101.

In the present exemplary embodiment, the server printing processing is performed as described above. In the server printing, the printing processing is executed by the printer 103 via the server 102. As a result, no special setting is needed between the PC 101 and the printer 103.

<Server Registration>

Figure 4:
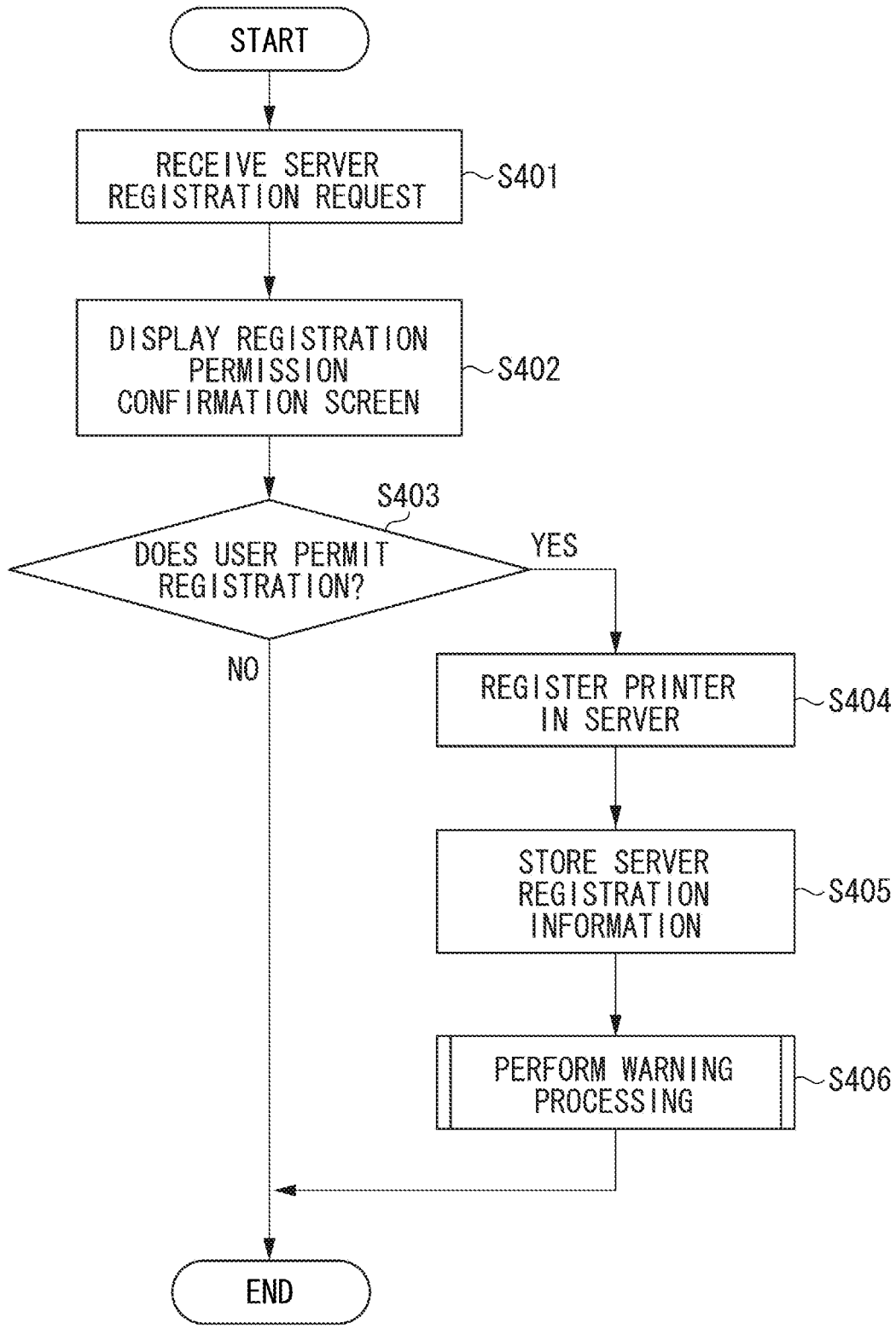
FIG. 4 is a flow chart illustrating processing performed by a printer when a server registration request is received.

The mutual registration of the server 102 and the printer 103 will be described. FIG. 4 illustrates processing performed by the printer 103 when a server registration request is received.

In a case of using the server printing function, first, the server 102 performs a procedure of registering the printer 103, and the printer 103 performs a procedure of registering the server 102.

If a registration setting start instruction is transmitted to the server 102 from the PC 101 or the printer 103, the CPU 201b transmits a server registration request to the printer 103. The processing flow performed by the CPU 301 when the server registration request is received will be described.

In step S401, if the server registration request is received, then in step S402, the CPU 301b displays a registration permission confirmation screen on the operation unit 316. If the user performs an operation to permit the registration (YES in step S403), the CPU 301 transmits information about the printer 103 to the server 102. In step S404, the server 102 registers the printer 103 based on the received information (registration information, authentication information). Then, in step S405, the CPU 301 acquires from the server 102 information (registration information, authentication information) such as information about the server 102 and user account information and stores the acquired information in the flash ROM 302 to complete the registration processing. The information about the printer 103 is registered so that the CPU 201b can provide an object indicating the printer 103 as an output destination candidate at the time of generating the web screen for the print instruction.

In step S406, when the registration processing is completed, the CPU 301 starts warning processing. A server registration flag is stored in the NVMEM 304. If the server registration is performed, "1" is stored. On the other hand, if the server registration is not performed, "0" is stored. Details of the warning processing will be described below.

If the user performs an operation not to permit the registration (NO in step S403), the processing relating to the registration is ended. The information about the server 102 is registered so that the CPU 301 can determine whether a device accessing the printer 103 thereafter is the server 102.

In step S404, in a case of permitting registration information in the server, server registration processing is performed. More specifically, information for performing network communication with the printer 103 is transmitted together with the user account information to the printing server 102. Next, the printer 103 stores in the NVMEM 304 server registration information indicating that the printer 103 is registered in the server 102. When the printer 103 is registered in the server 102, "1" is stored as the server registration information. On the other hand, when the printer 103 is not registered in the server 102, "0" is stored as the server registration information.

<Server Printing Permission Setting>

Figure 5:
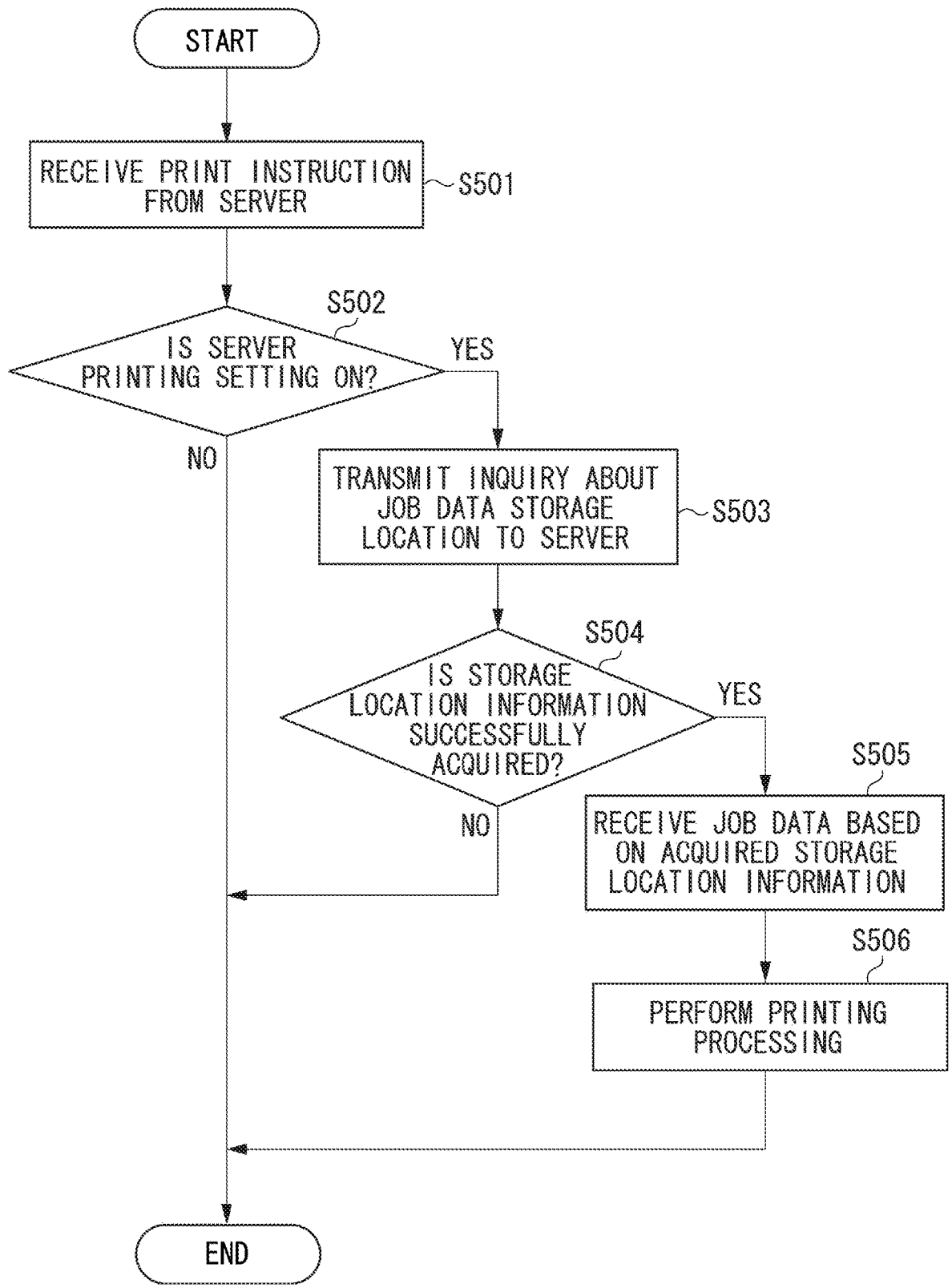
FIG. 5 is a flow chart illustrating processing performed by a printer when a print instruction is received from a server.

Next, the server printing permission setting will be described. FIG. 5 is a flow chart illustrating a processing flow performed by the printer 103 when the print instruction is received from the server 102.

The server printing function on/off can be set to the printer 103 according to the present exemplary embodiment. In a case in which the server printing function is on, when the print instruction is received from the server 102, the printer 103 receives print data from the server 102 and starts printing processing. On the other hand, in a case in which the server printing function is off, when the print instruction is received from the server 102, the printer 103 does not receive print data from the server 102 and does not start printing processing. Use of this function can prevent interruption and execution of server printing processing when, for example, printing processing of print data transmitted from the PC 101 is prioritized. Next, the processing flow performed by the CPU 301 will be described with reference to FIG. 5.

In step S501, if the CPU 301 receives a print instruction from the server 102, the CPU 301 checks whether the server printing setting is on or off. Whether the server printing setting is on or off is checked based on a printing setting flag stored in the NVMEM 304. If the printing setting flag indicates that the server printing setting is off (NO in step S502), the CPU 301 returns to the server 102 a signal to deny execution of printing, and the processing is ended. In other words, the CPU 301 does not receive the print data from the server 102 (does not allow reception of the print data). On the other hand, if the printing setting flag indicates that the server printing setting is on (YES in step S502), then in step S503, the CPU 301 transmits to the server 102 an inquiry about a print data (job data) storage location. If the print data storage location information is not successfully acquired (NO in step S504), the processing is ended. On the other hand, if the print data storage location information is successfully acquired (YES in step S504), then in step S505, the CPU 301 receives print data based on the acquired storage location information. In other words, the CPU 301 allows reception of the print data from the server 102. In step S506, upon receiving the print data, the CPU 301 causes the printer engine 311 to perform printing processing based on the received print data.

<Warning Processing Execution Determination>

Figure 7:
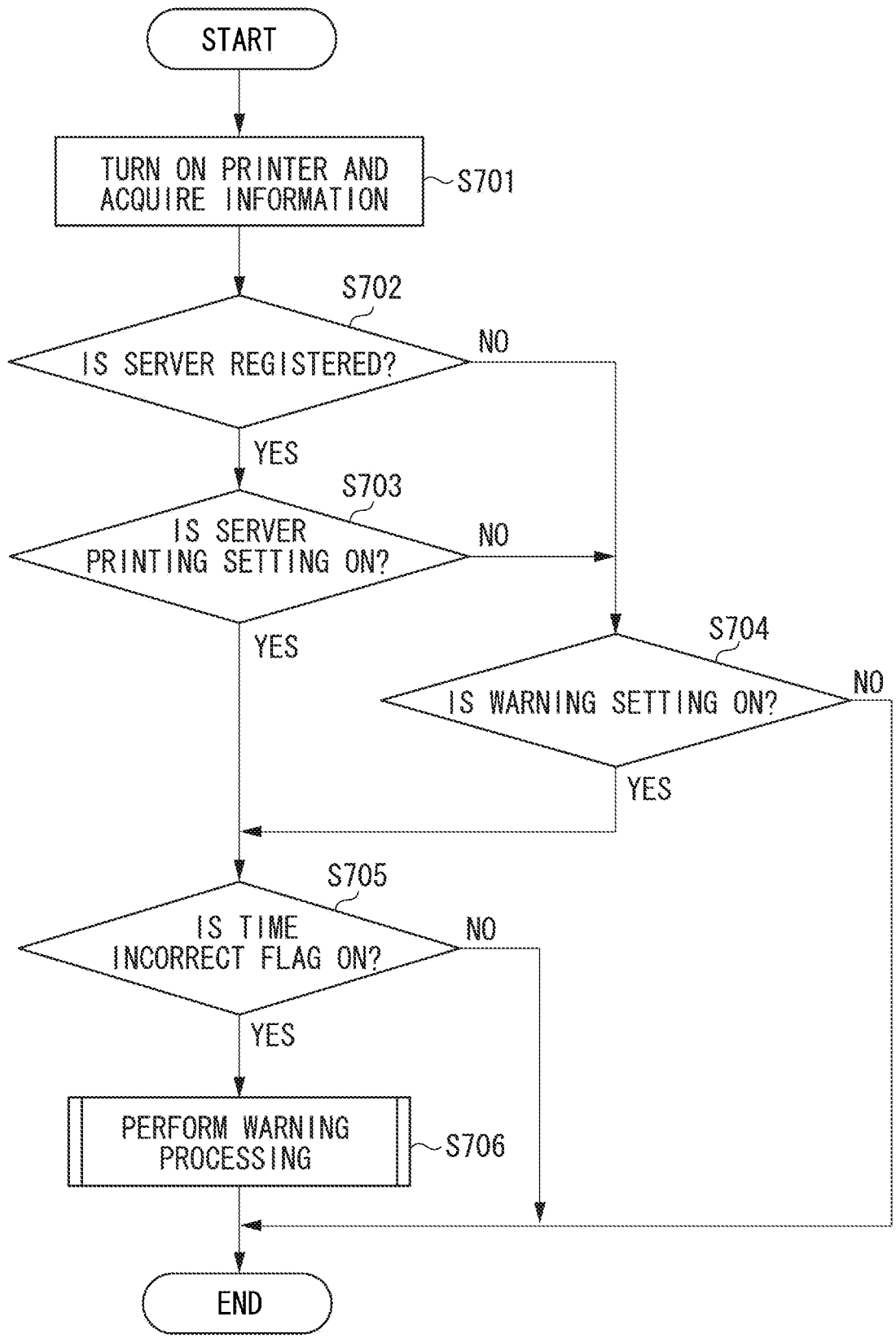

Next, the determination on execution of warning processing will be described. FIG. 7 illustrates a determination flow whether to execute warning processing when the printer 103 is turned on.

To use the server printing function, the printer 103 needs to be in a state in which the printer 103 can receive print data from the server 102. However, there are cases in which the server 102 according to the present exemplary embodiment does not transmit print data to the printer 103 from the viewpoint of security. More specifically, in a case in which the time of the printer 103 acquired at the time of checking the status is different from the current time (the internal time of the server 102) (case in which the time is incorrect), the server 102 does not transmit print data to the printer 103. In other words, if the internal time of the printer 103 is incorrect, the user cannot use the server printing function of the printer 103. Being unable to use the server printing function is inconvenient for the user, so that if the reason why the server printing function cannot be used is the internal time of the printer 103, it is desirable to notify (warn) the user of the reason. Details will be described below with reference to FIG. 7.

In step S701, if the printer 103 being in a power-off state is turned on, the CPU 301 reads various types of setting information from the NVMEM 304. In step S702, after reading the various types of setting information, the CPU 301 determines whether a server for server printing is registered.

If the server is registered, the server printing function is more likely to be used. Therefore, in step S702, the server registration status is determined. If there is information indicating that the server is registered (YES in step S702), then in step S703, the CPU 301 checks the server printing setting. On the other hand, if there is no information indicating that the server is registered (NO in step S702), then in step S704, the CPU 301 checks a warning setting.

In the present exemplary embodiment, the server printing setting is checked in step S703 in addition to the server registration status to make a reliable determination about whether to use the server printing function. If a server printing setting flag is on (YES in step S703), then in step S705, the CPU 301 checks a time incorrect flag. On the other hand, if the server printing setting flag is off (NO in step S703), then in step S704, the CPU 301 checks the warning setting.

Even in an environment in which the server printing processing is not performed, it is sometimes desirable for the user to know the incorrect state of the time. For this reason, in the printer 103 according to the present exemplary embodiment, the warning on/off can be set independently from the server printing function. To enable appropriate determination when such a function is included, the warning setting is checked in step S704. If a warning setting flag is on (YES in step S704), then in step S705, the CPU 301 checks the time incorrect flag. On the other hand, if the warning setting flag is off (NO in step S704), the processing is ended.

In order to perform warning processing, it is required to check whether the time can be incorrect. Accordingly, in step S705, the time incorrect flag is checked.

If the time incorrect flag is on (YES in step S705), then in step S706, the CPU 301 performs a series of warning processing (notification processing). On the other hand, if the time incorrect flag is off (NO in step S705), the processing is ended.

By performing the processing flow as described above, the printer 103 can perform warning processing at appropriate timing. In other words, it is possible for the printer 103 to perform warning processing with respect to a user who needs the warning processing, but not to perform warning processing with respect to a user who does not need the warning processing. In other words, the printer 103 can execute a mode in which the warning processing is performed and a mode in which the warning processing is not performed. As a result, according to the present exemplary embodiment, the user who uses the server printing function can use the server printing function as appropriate by setting the time based on the warning. Further, according to the present exemplary embodiment, the warning screen is not displayed to the user who does not use the server printing function (user not using the server printing function), so the user does not have to set the time to avoid an unnecessary operation. Further, according to the present exemplary embodiment, since the warning screen is not displayed, the user who does not use the server printing function (user not using the server printing function) is not likely to be disturbed when performing other operations using the printer 103. As a result, the user is prevented from being disturbed and annoyed by the warning screen. Thus, according to the present exemplary embodiment, impairment in usability caused by the display of the warning screen is prevented.

<Time Incorrect Flag>

Figure 8:
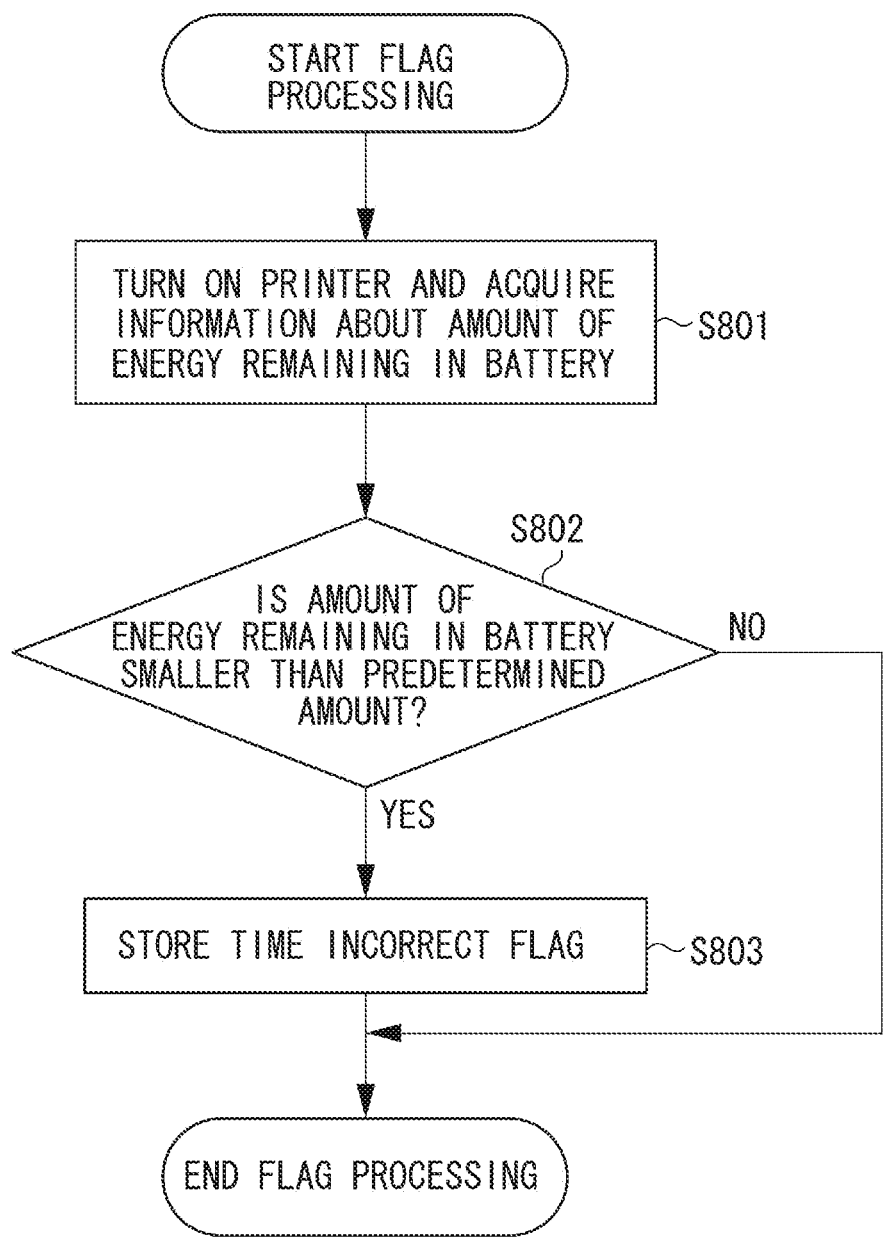
FIG. 8 is a flow chart illustrating a time incorrect flag storage flow.

The time incorrect flag will be described. FIG. 8 illustrates a process of storing the time incorrect flag.

In order to realize the above-described warning processing execution determination flow, a function capable of detecting whether the internal time of the printer 103 is incorrect is needed. Therefore, in the present exemplary embodiment, the time incorrect flag that is on is stored when the internal time can be incorrect. More specifically, if the amount of energy remaining in the battery 321 when the printer 103 is on is lower than a predetermined value (e.g., smaller than 1 mAh, 0 mAh), the time incorrect flag is stored, because if the amount of energy remaining in the battery 321 becomes zero, the time retained by the RTC circuit 319 is returned to the initial value. If the SNTP server setting is set as appropriate to the printer 103 and the current time can be acquired reliably, the above-described problem does not arise even when the amount of energy remaining in the battery 321 becomes zero. In the present exemplary embodiment, the printer 103 without the SNTP server setting function or the printer 103 including the SNTP server setting function that is not set appropriately will be described. The processing will be described with reference to the flow chart.

In step S801, if the printer 103 having been turned off is turned back on, the CPU 301 acquires from the RTC circuit 319 the amount of energy remaining in the battery 321. The RTC circuit 319 includes a detection sensor (detection unit) capable of detecting the amount of energy remaining in the battery 321. If the amount of energy remaining in the battery 321 is smaller than the predetermined value (e.g., smaller than 1 mAh or 0 mAh) (YES in step S802), then in step S803, the CPU 301 stores the time incorrect flag in the NVMEM 304, and the processing is ended. On the other hand, if the amount of energy remaining in the battery 321 is not smaller than the predetermined value (NO in step S802), the processing is ended.

The time incorrect flag is stored as described above, so that the time incorrect flag can be used in the warning processing execution determination. A method of detecting the state of the incorrect time is not limited to the method based on a result of detection of the amount of energy remaining in the battery 321. For example, the time incorrect flag may be set on when the internal time is the initial value. Further, the time at the time of shipment from a factory may be stored in the NVMEM 304, and the time incorrect flag may be set on if the internal time is earlier than the stored time.

<Warning Processing>

Figure 9:
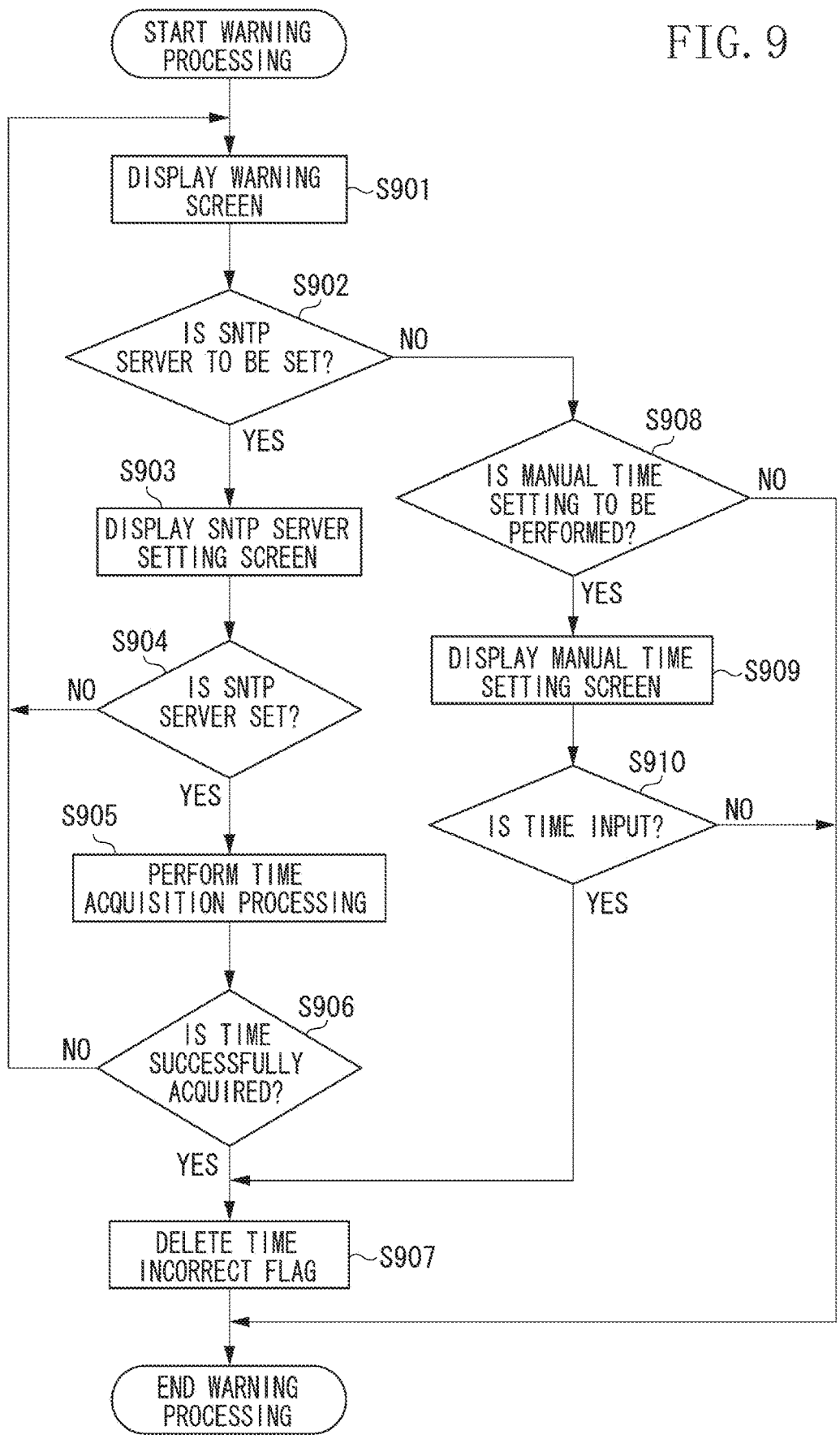
FIG. 9 is a flow chart illustrating a warning processing flow.

The warning processing will be described. FIG. 9 illustrates a processing flow of warning processing. FIGS. 11A, 11B, and 11C respectively illustrate a warning screen, a time setting screen, and an SNTP server setting screen.

As described above, the server printing function cannot be used when the internal time of the printer 103 is incorrect. Therefore, if the state that the internal time of the printer 103 is incorrect is detected, it is desirable to warn the user of the state and prompt the user to set the time.

In the present exemplary embodiment, a warning screen 1110 can be displayed on the operation unit 316 as illustrated in FIG. 11A.

The warning screen 1110 is a notification screen for prompting the user to set the time. The warning screen 1110 specifies that the time is incorrect, a cause of the incorrect time, and that the server printing function cannot be used. Further, the warning screen 1110 includes a plurality of objects including a time setting button 1111, a SNTP server setting button 1112, and a "do not set" button 1113.

In the present exemplary embodiment, the button for displaying the time setting screen is provided on the warning screen to improve user convenience. Further, in the present exemplary embodiment, not only the manual input but also the SNTP server setting are proposed as the time setting method on the warning screen. This enables the user to select a solution suitable for the skill level of the user. Further, an error in setting the time manually by the user is expected to be a maximum of about 10 minutes. The error is sufficiently smaller than the difference in time based on which the server 102 determines that the time of the printer 103 is incorrect.

The time setting button 1111 is a button for giving an instruction to set the internal time of the printer 103. If the time setting button 1111 is selected, a time setting screen 1120 is displayed on the operation unit 316 as illustrated in FIG. 11B.

The SNTP server setting button 1112 is a button for giving an instruction to register the SNTP server setting. If the SNTP server setting button 1112 is selected, a SNTP server setting screen 1130 is displayed on the operation unit 316 as illustrated in FIG. 11C.

The "do not set" button 1113 is a button for skipping a setting instruction relating to the time.

The time setting screen 1120 is for prompting the user to manually input the current time. The time setting screen 1120 includes a plurality of objects including a time input form 1121, an apply button 1122, a cancel button 1123.

The time input form 1121 is a form for inputting the current time. The "apply" button 1122 is a button for reflecting the setting input to the time input form 1121 and storing it as a set value of the RTC circuit 319. The cancel button 1123 is a button for skipping the time setting.

The SNTP server setting screen 1130 is a screen for setting automatic acquisition of the current time. The SNTP server setting screen 1130 includes a plurality of objects including a server input form 1131, an update interval input form 1132, an apply button 1133, a cancel button 1134.

The server input form 1131 is a form for inputting an address of the SNTP server for the acquisition of time. The update interval input form 1132 is a form for inputting an interval of the acquisition of time information from the SNTP server. The apply button 1133 is a button for reflecting what are input to the input forms. The cancel button 1134 is a button for skipping the SNTP server setting.

A specific processing flow of warning processing is as follows.

In step S901, when the warning processing is started, the CPU 301 displays the warning screen 1110 on the operation unit 316. If an instruction to set the SNTP server is received while the warning screen 1110 is displayed (YES in step S902), then in step S903, the CPU 301 displays the SNTP server setting screen 1130 on the operation unit 316. On the other hand, if no instruction to set the SNTP server is received while the warning screen 1110 is displayed (NO in step S902), then in step S908, the CPU 301 checks whether an instruction to set the time is received.

In step S904, while the SNTP server setting screen 1130 is displayed, the CPU 301 checks whether the SNTP server is set. If the SNTP server is set (YES in step S904), then in step S905, the CPU 301 starts time acquisition processing. On the other hand, if the SNTP server is not set (NO in step S904), then in step S901, the warning screen is displayed again.

In step S906, after a trial of the time acquisition processing, the CPU 301 checks whether time information is successfully acquired. If the time information is successfully acquired (YES in step S906), then in step S907, the CPU 301 deletes the time incorrect flag (i.e., the CPU 301 sets the time incorrect flag off). If the time information is not acquired (NO in step S906), then in step S901, the warning screen is displayed again.

If an instruction to manually set the time is received while the warning screen 1110 is displayed (YES in step S908), then in step S909, the CPU 301 displays the time setting screen 1120 on the operation unit 316. If an instruction to skip the setting of the time is received while the warning screen 1110 is displayed (NO in step S908), the processing is ended.

In step S910, the CPU 301 checks whether the time is set while the time setting screen 1120 is displayed. If the time is input (YES in step S910), the CPU 301 writes the set time to the RTC circuit 319 and deletes the time incorrect flag. On the other hand, if the time is not input (NO in step S910), the processing is ended.

<Setting Processing>

Figure 6:
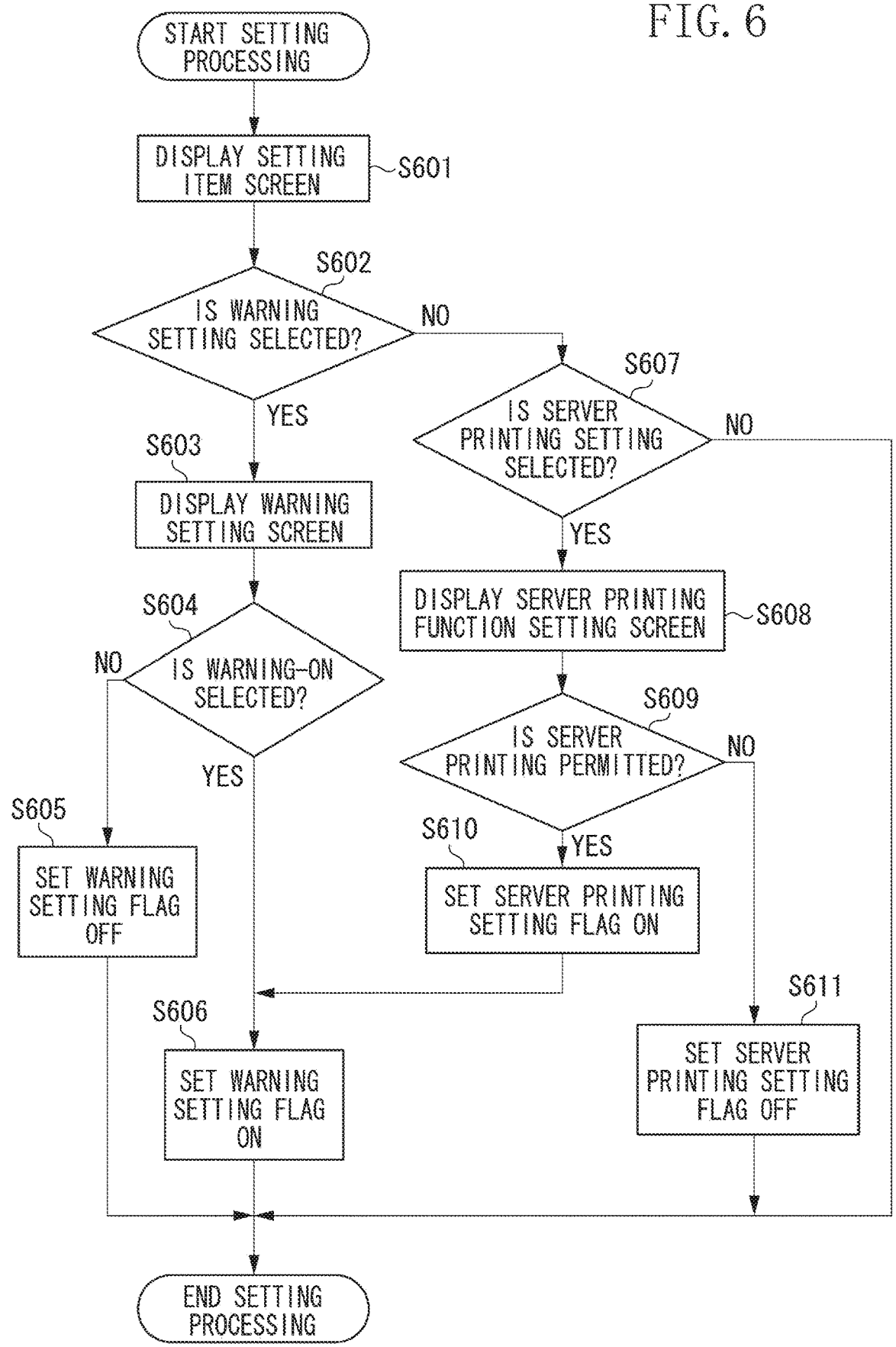
FIG. 6 is a flow chart illustrating processing performed by a printer when printer settings are set.

Next, the setting processing of the printer 103 will be described. FIG. 6 illustrates a processing flow performed by the printer 103 when the printer setting is set.

As described above, the printer 103 according to the present exemplary embodiment executes warning processing to prompt the user to set the time when the server printing function is expected to be used. However, even in a case in which the server printing function is not to be used, it is sometimes desirable to prompt the user to execute warning processing when the time is incorrect. For this reason, the printer 103 according to the present exemplary embodiment includes a setting function relating to a condition for execution of warning processing. The user can use the setting function by operating the operation unit 316.

Figure 10A:
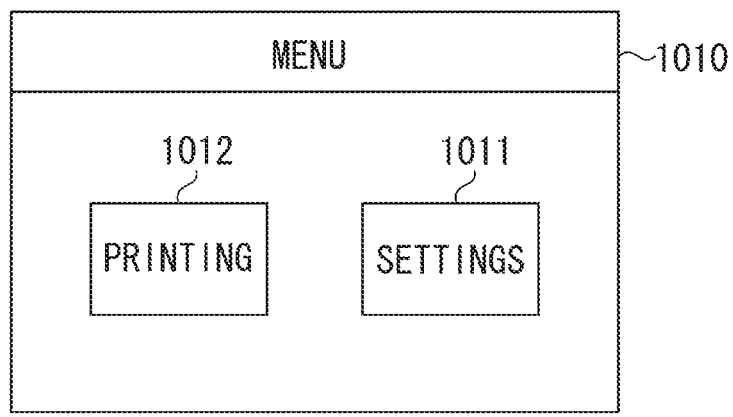
FIGS. 10A, 10B, 10C, and 10D respectively illustrate a menu screen, a setting screen, a time warning setting screen, and a server printing function setting screen.

When the printer 103 being in the power-off state is turned on, a menu screen 1010 is displayed on the operation unit 316 as illustrated in FIG. 10A.

The menu screen 1010 includes a plurality of objects including a printing function button 1012 and a setting button 1011.

The printing function button 1012 is a button for performing printing using print data retained in the flash ROM 302. If the printing function button 1012 is selected, a print data selection screen (not illustrated) is displayed on the operation unit 316.

Figure 10B:
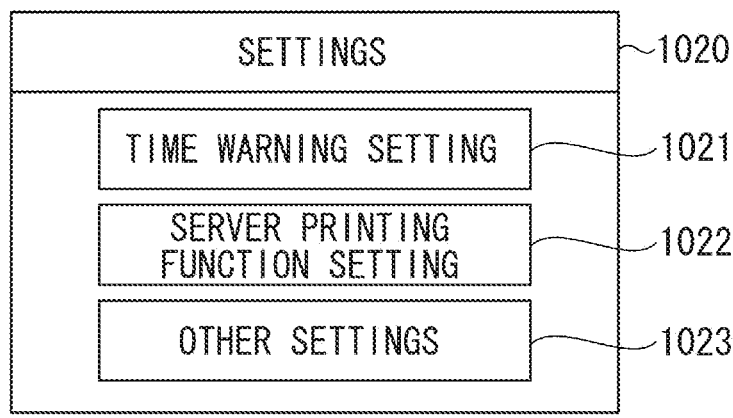

The setting button 1011 is a button for making various settings of the printer 103. If the setting button 1011 is selected, a setting item screen 1020 is displayed on the operation unit 316 as illustrated in FIG. 10B.

The setting item screen 1020 is a screen for selecting from the functions of the printer 103 a function that the user desires to change the setting. The setting item screen 1020 includes a plurality of objects including a time warning setting button 1021, a server printing function setting button 1022, and an "other settings" button 1023.

Figure 10C:
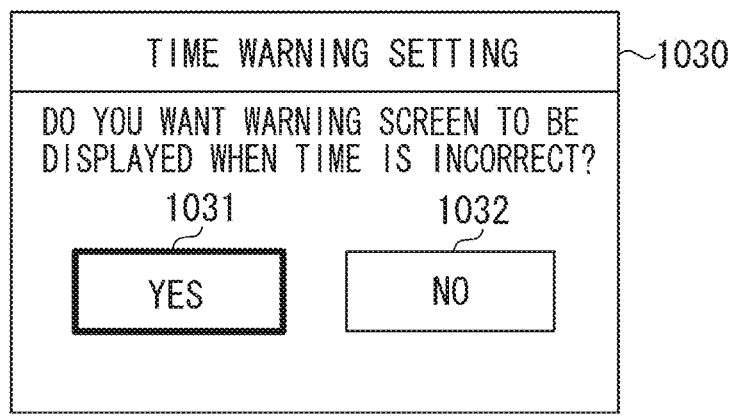
Figure 10D:
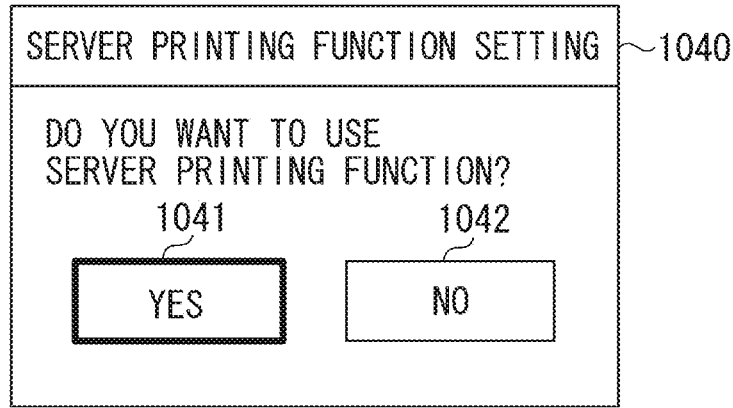

The time warning setting button 1021 is a button for changing the time warning setting. If the time warning setting button 1021 is selected, a warning setting screen 1030 is displayed on the operation unit 316 as illustrated in FIG. 10C.

The server printing function setting button 1022 is a button for making a use setting of the server printing function. If the server printing function setting button 1022 is selected, a server printing function setting screen 1040 is displayed on the operation unit 316 as illustrated in FIG. 10C.

The other settings button 1023 is a button for making a setting other than the above-described settings.

The warning setting screen 1030 is a screen for making a setting as to whether to provide a warning when the time is incorrect. The warning setting screen 1030 includes a plurality of objects including a warning-on button 1031 and a warning-off button 1032. The warning-on button 1031 is a button for displaying the warning screen every time the time is incorrect without fail. If the warning-on button 1031 is selected, the warning setting flag that is in the on state is stored in the NVMEM 304. The warning-off button 1032 is a button for not always displaying the warning screen when the time is incorrect. If the warning-off button 1032 is selected, the warning setting flag that is in the off state is stored in the NVMEM 304.

The server printing function setting screen 1040 is a screen for making a setting as to whether to use the server printing function. The server printing function setting screen 1040 includes a plurality of objects including a server printing on button 1041 and a server printing off button 1042. The server printing on button 1041 is a button for permitting the server printing function. If the server printing on button 1041 is selected, the server printing flag that is in the on state is stored in the NVMEM 304. If the server printing off button 1042 is selected, the server printing flag that is in the off state is stored in the NVMEM 304.

A processing flow of setting processing is as follows.

In step S601, if the setting processing is started, the CPU 301 displays the setting item screen 1020 on the operation unit 316. In step S602, if an instruction to set the warning setting is received while the setting item screen 1020 is displayed (YES in step S602), then in step S603, the CPU 301 displays the warning setting screen 1030 on the operation unit 316. On the other hand, if no instruction to make the warning setting is received while the setting item screen 1020 is displayed (NO in step S602), then in step S607, the CPU 301 checks whether an instruction to set the server printing setting is received.

In step S604, the CPU 301 checks whether the warning setting is set on while the warning setting screen 1030 is displayed. If an instruction to set the warning setting on is received (YES in step S604), then in step S606, the CPU 301 sets the warning setting flag on. On the other hand, if an instruction to set the warning setting off is received (NO in step S604), then in step S605, the CPU 301 sets the warning setting flag off.

In step S607, if an instruction to set the server printing setting is received while the setting item screen 1020 is displayed (YES in step S607), then in step S608, the CPU 301 displays the server printing function setting screen 1040 on the operation unit 316. On the other hand, if an instruction to set the other settings is received while the setting item screen 1020 is displayed (NO in step S607), the CPU 301 sets the other settings, and the processing is ended.

In step S609, if an instruction to set the server printing function on is received while the server printing function setting screen 1040 is displayed (YES in step S609), then in step S610, the CPU 301 sets the server printing setting flag on and then sets the warning setting flag on, and the processing is ended. On the other hand, if an instruction to set the server printing function off is received while the server printing function setting screen 1040 is displayed (NO in step S609), then in step S611, the CPU 301 sets the server printing setting flag off, and the processing is ended.

As described above, in the present exemplary embodiment, the warning setting flag is set on when the server printing setting flag is set on. Thus, when the server printing function is expected to be used, the printer 103 can reliably display the warning screen 1110.

Next, an image forming system according to a second exemplary embodiment will be described below. In the image forming system 100 according to the first exemplary embodiment, the PC 101 and the printer 103 are separated. In other words, the function of requesting the server 102 to transmit print data and the function of receiving the print data from the server 102 are included in different apparatuses. On the other hand, the printer 103 according to the second exemplary embodiment includes the operation unit 316 having the web browser function and, thus, can request the server 102 to transmit print data. In other words, the function of requesting the server 102 to transmit print data and the function of receiving the print data from the server 102 are realized in the single apparatus. This configuration enables the user to use the server printing function by simply operating the printer 103. The printer 103 having the above-described configuration is different from the first exemplary embodiment in the warning screen display timing. The configuration according to the second exemplary embodiment is similar to the configuration according to the first exemplary embodiment except for the above-described difference. Thus, similar components are given the same reference numerals, and detailed description thereof is omitted.

Figure 13A:
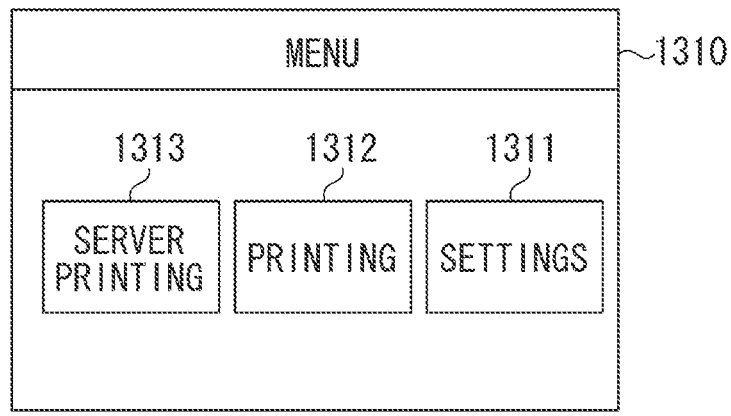
FIGS. 13A, 13B, and 13C respectively illustrate a menu screen, a server login screen, and a server printing instruction screen according to a second exemplary embodiment.
Figure 13B:
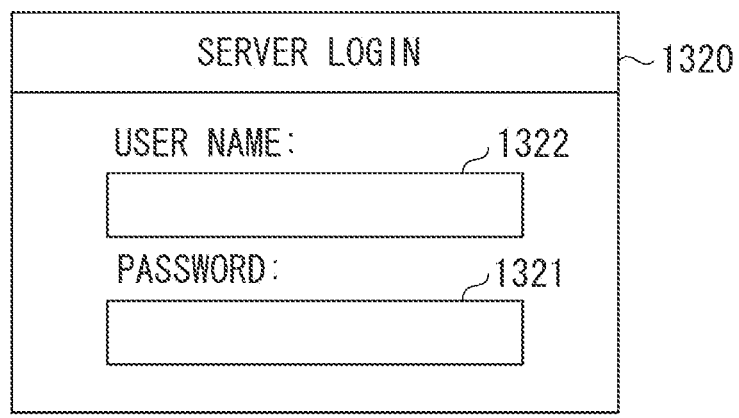
Figure 13C:
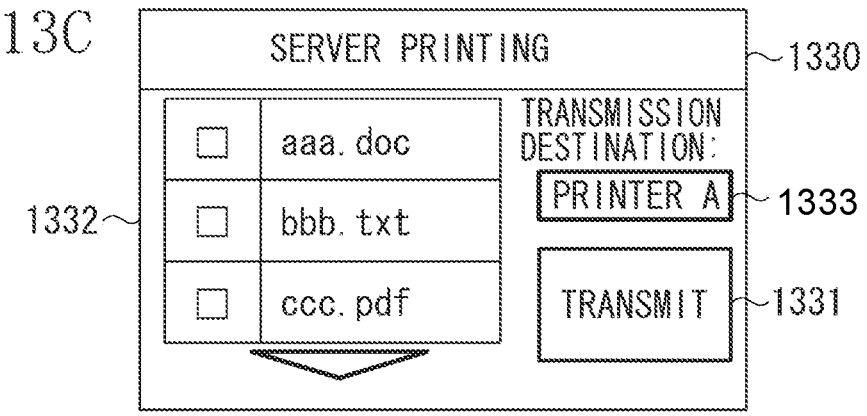

In the second exemplary embodiment, an instruction to execute server printing can be given using the operation unit 316. FIGS. 13A, 13B, and 13C respectively illustrate a menu screen, a server login screen, and a server printing instruction screen according to the second exemplary embodiment.

If the printer 103 being in the power-off state is turned on, a menu screen 1310 (i.e., selection screen) is displayed on the operation unit 316 as illustrated in FIG. 13A. The menu screen 1310 includes a plurality of objects including a printing function button 1312, a setting button 1311, and a server printing button 1313.

The printing function button 1312 has a similar function to the function of the printing function button 1012. The setting button 1311 has a similar function to the function of the setting button 1011.

The server printing button 1313 is a button for accessing the server 102 to use the server printing function. If the server printing button 1313 is selected, a login screen 1320 is displayed by the web browser function of the operation unit 316.

The login screen 1320 is a screen for logging in to the server 102. The login screen 1320 includes a user name input form 1322 and a password input form 1321.

If a user name and a password are respectively input to the user name input form 1322 and the password input form 1321, the server 102 starts user authentication processing. If the user authentication is successful, an instruction screen 1330 is displayed on the operation unit 316.

The instruction screen 1330 is a screen for giving an instruction to transmit a request to the server 102 so that print data is transmitted from the server 102 to the printer 103. The instruction screen 1330 includes a plurality of objects including a document list 1332, a transmission destination setting form 1333, and a transmission start button 1331. The document list 1332 is an object which displays a list of document data of the logged-in user among the data stored in the server 102. The user can select a document to be used in server printing. The transmission destination setting form 1333 is an object for selecting a printer to be used in server printing. In the present exemplary embodiment, the printer is selected so that the printer 103 becomes a destination. The transmission start button 1331 is a button for causing (requesting) the server 102 to execute print data transmission processing based on the document data selected from the document list 1332. In other words, if the transmission start button 1331 is selected, a request signal is transmitted from the printer 103 to the server 102. The above-described request instruction includes a series of operations for transmitting the request to the server 102, such as an operation to select the transmission start button 1331, an operation to select a job from the document list 1332, and an operation to select the server printing button 1313 on the menu screen 1310. At this time, the controller unit 313 functions as a reception unit for receiving the request instruction from the user via the operation unit 316.

<Process of Warning>

Figure 14:
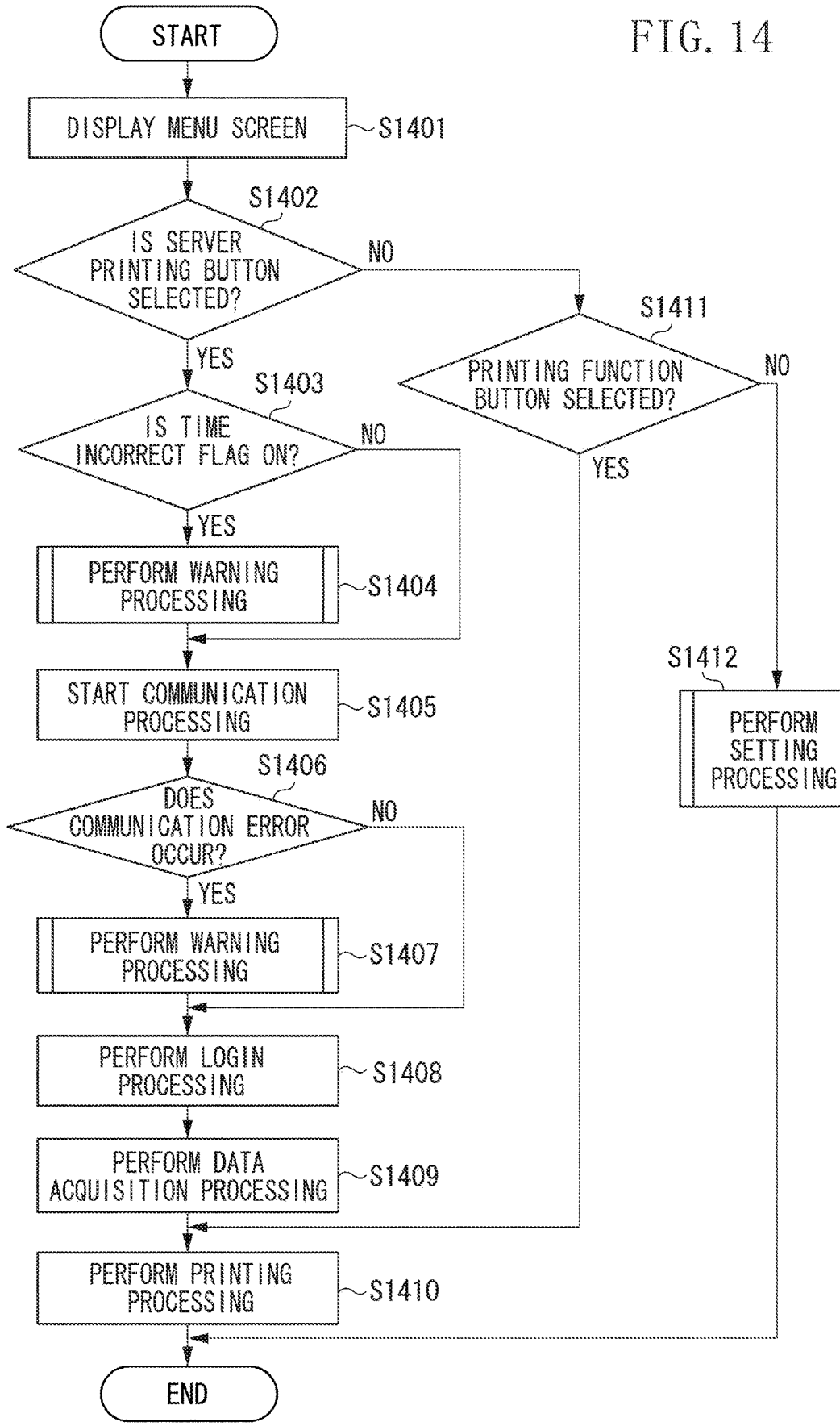
FIG. 14 is a flow chart illustrating a warning processing execution timing determination flow.

When the operations relating to server printing are performed as described above, execution of server printing is expected. Therefore, the CPU 301 determines the timing of warning processing according to a flow described below. FIG. 14 illustrates the warning processing execution timing determination flow.

First, in step S1401, the CPU 301 displays the menu screen 1310 on the operation unit 316. In step S1402, if the server printing button 1313 is selected while the menu screen 1310 is displayed (YES in step S1402), then in step S1403, the CPU 301 checks the time incorrect flag. If the time incorrect flag is on (YES in step S1403), then in step S1404, the CPU 301 performs warning processing. On the other hand, if the time incorrect flag is off (NO in step S1403), the CPU 301 skips the warning processing. Thereafter, in step S1405, the CPU 301 starts communication processing to communicate with the server 102. If an error occurs in the communication processing (YES in step S1406), then in step S1407, the CPU 301 performs warning processing. On the other hand, if no error occurs in the communication processing (NO in step S1406), the CPU 301 skips the warning processing. Thereafter, in step S1408, the CPU 301 performs login processing to log in to the server 102. In step S1409, the CPU 301 performs data acquisition processing to acquire print data from the server 102. In step S1410, the CPU 301 performs printing processing based on the acquired print data. Then, the processing is ended.

If the printing function button 1312 is selected while the menu screen 1310 is displayed (NO in step S1402 and YES in step S1411), then in step S1410, the CPU 301 performs printing processing using print data stored in the flash ROM 302. Then, the processing is ended.

If the setting button 1311 is selected while the menu screen 1310 is displayed (NO in step S1402 and NO in step S1411), then in step S1412, the CPU 301 performs setting processing. Then, the processing is ended.

As described above, in the present exemplary embodiment, when execution of server printing is expected, warning processing is executed at the timing at which communication with the server 102 is performed. As a result, the problem that print data cannot be received from the server 102 is solved. Further, in the present exemplary embodiment, no warning processing is performed when normal printing processing is executed. As a result, impairment in operability of the operation unit 316 is prevented.

Other Embodiments

In the first and second exemplary embodiments, the examples in which warning processing is performed only when use of server printing is expected. However, a different configuration that can overcome the state in which the server printing function cannot be used, can be employed. For example, a printer including the server printing function can be configured to always provide a warning every time the time is incorrect. More specifically, warning processing (steps S705 and S706) can be performed based only on the presence of the time incorrect flag without performing the determination processing in FIG. 7 (steps S702, S703, and S704). When such a method is employed, the state that the server printing function cannot be used is overcome if the user sets the internal time according to the warning. Especially, the message "the server printing function cannot be used when the time setting is incorrect" is displayed on the warning screen 1110 so that the user can recognize the reason why the server printing function cannot be used.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-102861, filed May 23, 2016, which is hereby incorporated by reference herein in its entirety.

What is claimed is:

1. An apparatus comprising:
   a memory device that stores a set of instructions; and
   at least one processor that executes the instructions, the instructions, when executed, causing the apparatus to perform operations comprising:
   a retaining unit configured to retain time;
   a first determination unit configured to determine that the retaining unit does not retain correct time;
   a second determination unit configured to determine whether a predetermined setting for causing a server to execute a predetermined function is made; and
   a display control unit configured to display, on a display unit, a screen for prompting a user to input time in a case where the first determination unit determines that the retaining unit does not retain the correct time and the second determination unit determines that the predetermined setting is made, and not display, on the display unit, the screen for prompting the user to input the time regardless of whether the retaining unit retains the correct time in a case where the second determination unit determines that the predetermined setting is not made,
   wherein the first determination unit is configured to determine that the retaining unit does not retain the correct time in a case where a flag to be added to the retaining unit when it is determined that an amount of energy remaining in a battery of the retaining unit is smaller than a predetermined value is detected.

2. The apparatus according to claim 1, wherein the time retained by the retaining unit is put back to an initial value in a case where it is determined that the amount of energy remaining in the battery of the retaining unit is smaller than the predetermined value.

3. The apparatus according to claim 2, further comprising:
   a third determination unit configured to determine whether the amount of energy remaining in the battery of the retaining unit is smaller than the predetermined value; and
   a fourth determination unit configured to determine whether a setting for acquiring current time from a simple network time protocol (SNTP) server is made,
   wherein the flag is not added in a case where the third determination unit determines that the amount of energy remaining in the battery of the retaining unit is smaller than the predetermined value and the fourth determination unit determines that the setting for acquiring the current time from the SNTP server is made, and
   wherein the flag is added in a case where the third determination unit determines that the amount of energy remaining in the battery of the retaining unit is smaller than the predetermined value and the fourth determination unit determines that the setting for acquiring the current time from the SNTP server is not made.

4. The apparatus according to claim 1, wherein the apparatus is a printer configured to execute printing.

5. The apparatus according to claim 1, wherein the retaining unit is configured to retain time updating the time based on time input by a user.

6. The apparatus according to claim 1, wherein not display, on the display unit, the screen for prompting the user to input the time regardless of whether the retaining unit retains the correct time means not display the screen on the display unit without the first determination unit determining whether the retaining unit retains the correct time.

7. An apparatus comprising:
   a memory device that stores a set of instructions; and
   at least one processor that executes the instructions, the instructions, when executed, causing the apparatus to perform operations comprising:
   a retaining unit configured to retain time;
   a first determination unit configured to determine that the retaining unit does not retain correct time;
   a second determination unit configured to determine whether a destination server is registered; and
   a display control unit configured to display, on a display unit, a screen for prompting a user to input time in a case where the first determination unit determines that the retaining unit does not retain the correct time and the second determination unit determines that the destination server is registered, and not display, on the display unit, the screen for prompting the user to input the time regardless of whether the retaining unit retains the correct time in a case where the second determination unit determines that the destination server is not registered,
   wherein the first determination unit is configured to determine that the retaining unit does not retain the correct time in a case where a flag to be added to the retaining unit when it is determined that an amount of energy remaining in a battery of the retaining unit is smaller than a predetermined value is detected.

8. The apparatus according to claim 7, wherein the time retained by the retaining unit is put back to an initial value in a case where it is determined that the amount of energy remaining in the battery of the retaining unit is smaller than the predetermined value.

9. The apparatus according to claim 8, further comprising:
a third determination unit configured to determine whether the amount of energy remaining in the battery of the retaining unit is smaller than the predetermined value; and
a fourth determination unit configured to determine whether a setting for acquiring current time from a simple network time protocol (SNTP) server is made,
wherein the flag is not added in a case where the third determination unit determines that the amount of energy remaining in the battery of the retaining unit is smaller than the predetermined value and the fourth determination unit determines that the setting for acquiring the current time from the SNTP server is made, and
wherein the flag is added in a case where the third determination unit determines that the amount of energy remaining in the battery of the retaining unit is smaller than the predetermined value and the fourth determination unit determines that the setting for acquiring the current time from the SNTP server is not made.

10. The apparatus according to claim 7, wherein the apparatus is a printer configured to execute printing.

11. The apparatus according to claim 7, wherein the retaining unit is configured to retain time updating the time based on time input by a user.

12. The apparatus according to claim 7, wherein not display, on the display unit, the screen for prompting the user to input the time regardless of whether the retaining unit retains the correct time means not display the screen on the display unit without the first determination unit determining whether the retaining unit retains the correct time.

13. A control method for controlling an apparatus, the method comprising:
retaining time by a retaining unit;
determining that the retaining unit does not retain correct time;
determining by a second determination unit whether a predetermined setting for causing a server to execute a predetermined function is made: and
displaying by a display control unit, on a display unit, a screen for prompting a user to input time in a case where the first determination unit determines that the retaining unit does not retain the correct time and the second determination unit determines that the predetermined setting is made, and not display, on the display unit, the screen for prompting the user to input the time regardless of whether the retaining unit retains the correct time in a case where the second determination unit determines that the predetermined setting is not made,
wherein the first determination unit is configured to determine that the retaining unit does not retain the correct time in a case where a flag to be added to the retaining unit when it is determined that an amount of energy remaining in a battery of the retaining unit is smaller than a predetermined value is detected.

14. The method according to claim 13, wherein the time retained by the retaining unit is put back to an initial value in a case where it is determined that the amount of energy remaining in the battery of the retaining unit is smaller than the predetermined value.

15. The method according to claim 14, further comprising:
determining by a third determination unit whether the amount of energy remaining in the battery of the retaining unit is smaller than the predetermined value; and
determining by a fourth determination unit whether a setting for acquiring current time from a simple network time protocol (SNTP) server is made,
wherein the flag is not added in a case where the third determination unit determines that the amount of energy remaining in the battery of the retaining unit is smaller than the predetermined value and the fourth determination unit determines that the setting for acquiring the current time from the SNTP server is made, and
wherein the flag is added in a case where the third determination unit determines that the amount of energy remaining in the battery of the retaining unit is smaller than the predetermined value and the fourth determination unit determines that the setting for acquiring the current time from the SNTP server is not made.

16. The method according to claim 13, wherein the apparatus is a printer configured to execute printing.

17. The method according to claim 13, wherein not display, on the display unit, the screen for prompting the user to input the time regardless of whether the retaining unit retains the correct time means not display the screen on the display unit without the first determination unit determining whether the retaining unit retains the correct time.

* * * * *